United States Patent [19]

Nestler et al.

[11] 4,293,779
[45] Oct. 6, 1981

[54] CONTROL OF POWER SEMICONDUCTORS THROUGH CENTER-TAPPED TRANSFORMER WITH SELF-DEMAGNETIZING CIRCUITRY

[75] Inventors: Johannes Nestler; Hans Wrede, both of Berlin, Fed. Rep. of Germany

[73] Assignee: Licentia Patent-Verwaltungs-G.m.b.H., Frankfurt am Main, Fed. Rep. of Germany

[21] Appl. No.: 14,281

[22] Filed: Feb. 22, 1979

[30] Foreign Application Priority Data

Feb. 23, 1978 [DE] Fed. Rep. of Germany ....... 2808000

[51] Int. Cl.³ ............................................. H03K 17/60
[52] U.S. Cl. ............................... 307/252 C; 307/262; 307/318
[58] Field of Search .................... 307/252 C, 262, 318

[56] References Cited

U.S. PATENT DOCUMENTS 3,335,294  8/1967  Chauprape ........................ 307/262
3,597,630  8/1971  Compoly et al. .................. 307/318

FOREIGN PATENT DOCUMENTS 52-18159  2/1977  Japan ............................... 307/252 C

*Primary Examiner*—Joseph E. Clawson, Jr.
*Attorney, Agent, or Firm*—Spencer & Kaye

[57] ABSTRACT

In order to control a power semiconductor which can be triggered into conduction by pulses of one polarity and quenched again by pulses of the opposite polarity, by transmitting such pulses via a transformer to the power semiconductor connected at the secondary side of the transformer, such a pulse is formed by turning on a first transistor connected between one pole of a voltage source and a tap which divides the primary winding of the transformer into two partial windings, and by selectively turning on either one of second and third transistors each connected to the ends of a respective partial winding, and such a pulse is terminated by switching off the first transistor, while maintaining on the selected second or third transistor in order to cause the demagnetization current of the transformer to flow through the selected transistor and through a Zener diode connected between the tap of the primary winding and the other pole of the voltage source, the anode side of the first Zener diode being connected to the tap of the primary winding.

5 Claims, 2 Drawing Figures

CONTROL OF POWER SEMICONDUCTORS THROUGH CENTER-TAPPED TRANSFORMER WITH SELF-DEMAGNETIZING CIRCUITRY

BACKGROUND OF THE INVENTION

The present invention relates to a technique for controlling power semiconductors of the type which can be triggered by pulses of one polarity, referred to as triggering pulses and then quenched, or rendered nonconducting, by pulses of the opposite polarity, referred to as quenching pulses, the pulses being transmitted via a transformer to the power semiconductor, which is connected to the secondary of the transformer. Power semiconductors that must be actuated in this manner are, for example, gate turn-off thyristors or GTO's.

The triggering pulse for gate turn-off thyristors must be similar to the triggering pulse for ordinary thyristors. In order to keep the switch-on power loss low, a steep pulse slope is desired and the start of the triggering pulse is augmented by a current peak. After triggering the thyristors, the triggering readiness must be maintained in face of the fact that the thyristors can easily be quenched by current fluctuations. The triggering pulses employed in practice are therefore pulses which consist essentially of a short, steep pulse at a high current level and a long pulse at a lower current level.

With a control pulse of the opposite polarity, or quenching pulse, the conductive GTO thyristor is quenched. The quenching pulse for the GTO thyristor must be formed and dimensioned in accordance with the switch-off current amplification and the forward current of the GTO thyristor. The peak value of the gate turn-off current is limited, for a given gate turn-off voltage, by the transversal path resistance of the gate-cathode path of the thyristor. If the quenching pulse exceeds the breakthrough voltage of the gate-cathode layer, part of the control current flows off as reverse current via the pn-junction and does not become effective for charge elimination.

Optimum operation during turn-off thus results if the gate-cathode path is actuated by a constant voltage source at the highest permissible gate turn-off voltage. The gate turn-off voltage is much higher than the triggering voltage of the GTO thyristor.

Thus the control pulses must not only have opposite polarities for triggering and quenching but must also have characteristics which differ in principle.

If the control pulses are to be transmitted without potential to a power semiconductor, there occurs the additional difficulty that during transmission of the triggering and quenching pulses with the aid of a transformer, magnetizing currents may appear as interference currents which may trigger or quench the GTO thyristor when not desired. There even exists the danger of destruction if the triggering energy during switch-through is insufficient and the power losses rise to destructive values. The term "without potential" or "potential-free" means, that there is no conductive connection between the control member, including the various voltage sources, and the gate-circuit of the power semiconductor.

A compilation of the physical relationship has been made in the publication "Wissenschaftliche Berichte AEG-TELEFUNKEN" [Scientific Reports AEG-TELEFUNKEN] 50 (1977), Issue No. 1/2, pages 39–48.

SUMMARY OF THE INVENTION

It is an object of the present invention to provide a method for producing and transmitting, without potential, two different types of control pulses for power semiconductors wherein the two types of pulses not only have opposite polarities but also different characteristics which are adapted to the switching behavior of the power semiconductor and wherein the supply of sufficient triggering energy is assured for each switching process.

A further object of the invention is to keep the magnetization currents occurring in the form of undesirable interference currents during the potential-free transmission by means of a transformer away from the control terminal of the power semiconductor.

These and other objects are accomplished according to the present invention by forming the triggering pulse or the quenching pulse by actuation of a first transistor connected between one pole of a voltage source and a tap of the primary winding of the transformer, which primary winding is subdivided into two partial windings, and by selective actuation of either the second or the third transistor connected to the ends of the partial windings and by switching off the first transistor and further actuating the second or third transistor to cause the magnetization current to follow the transmitted triggering or quenching pulse on the primary side of the transformer to that transistor connected to the end of each partial winding of the primary winding which had previously formed the triggering or the quenching pulse, respectively, and to a first Zener diode connected between the tap of the primary winding and the other pole of the voltage source, the anode side of the Zener diode being connected to the tap of the primary winding.

This method assures a potential-free transmission of the actuation pulse, any desired setting of the triggering and quenching pulses, independently of one another, while assuring provision of sufficient triggering energy and avoiding undesirable interference currents. Moreover, the method according to the invention causes alternating magnetization which permits a smaller structural size for the transformer than if the magnetization were unidirectional.

An arrangement according to the invention for practicing the method is distinguished by the fact that the emitter-collector path of the first transistor is connected in paralllel with the voltage source and in series with a tap of the primary winding of the transformer, with a Zener diode whose anode is connected with the tap, and with a diode whose cathode is connected with the cathode of the Zener diode, and the two partial windings of the primary side of the transformer together with the series connection of the collector-emitter path of the second and third transistors are connected in parallel with the series circuit path formed by the diode and Zener diode.

This arrangement, by dividing the primary winding of the transformer into two partial windings for the separate transmission of triggering and quenching pulses and suitable actuation of two transistors connected to the partial windings, has the result that the magnetization current following a transmitted pulse is conducted to the primary side of the transformer.

In order for the demagnetization, or magnetic field collapse, process of the transformer to be effected as quickly as possible, a Zener diode is disposed in the path of the magnetization current.

DESCRIPTION OF THE PREFERRED EMBODIMENTS

Figure 1:
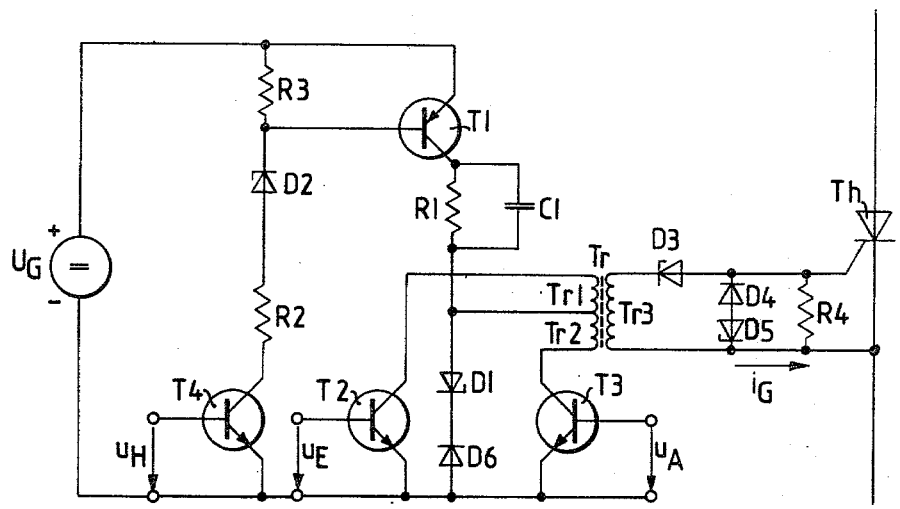
FIG. 1 is a circuit diagram of a preferred embodiment of a circuit operating according to the present invention.

The arrangement shown in FIG. 1 for controlling a power semiconductor Th includes a pulse forming or amplifying stage connected to the primary winding Tr1, Tr2 of a transformer Tr and connected to the secondary winding Tr3 of the transformer Tr, a control circuit for the power semiconductor Th, which in the present embodiment is a GTO thyristor.

The primary winding of the transformer Tr, which has been divided by a tap into the two partial windings Tr1 and Tr2, is connected at each of its ends to the collector of a respective one of transistors T2 and T3 whose emitters are connected to the negative pole of a direct voltage source $U_G$. The tap of the primary winding is also connected to the negative pole of the direct voltage source $U_G$ via the series connection of a first Zener diode D1 and a diode D6, the diodes D1 and D6 having their cathodes connected together. The tap is further connected with the positive pole of the direct voltage source $U_G$ via a series path formed by the collector-emitter path of a first transistor T1 and a first resistor R1 connected in parallel with a capacitor C1.

A series connection of a second resistor R2, a second Zener diode D2, connected via its cathode to resistor R2, a third resistor R3 and the collector-emitter path of a fourth transistor T4 is connected in parallel with the direct voltage source $U_G$ and serves to drive, or control, the base of the first transistor T1, this base being connected to the junction, or point of connection, between the second resistor R2 and the second Zener diode D2. The bases of the second, third and fourth transistors T2, T3 and T4 are fed with input signals $u_E$, $u_H$, respectively, and $u_A$, whose time patterns and functions will be explained below with reference to FIG. 2. The first Zener diode D1 connected to the tap of the primary winding of the transformer Tr serves essentially to speed up the demagnetization process of the transformer Tr after a pulse transmission.

The control circuit for power semiconductor Th, which circuit is connected to the secondary winding Tr3 of the transformer Tr, includes, in the illustrated embodiment, a third Zener diode D3 which is disposed between the gate of the power semiconductor Th and one end of secondary winding Tr3, the anode of diode D3 being connected to the gate, while the cathode of the power semiconductor Th is connected to the other end of the secondary winding Tr3. A fourth resistor R4 and the series connection of a second diode D4 and a fourth Zener diode D5 with their anodes connected to one another are connected in parallel with the gate-cathode path of the power semiconductor Th.

While the fourth Zener diode D5 serves to limit the gate turn-off voltage across the semiconductor gate-cathode path, the third Zener diode D3 can be used to compensate, across seconary winding Tr3, the difference in amplitude between triggering and quenching pulses so that the partial windings Tr1 and Tr2 on the primary side of the transformer Tr can be designed to have the same number of windings. However, with the arrangement according to the present invention it is also possible to do without diode D3 and to provide appropriately different transformation ratios by different sized partial windings on the primary side.

Figure 2:
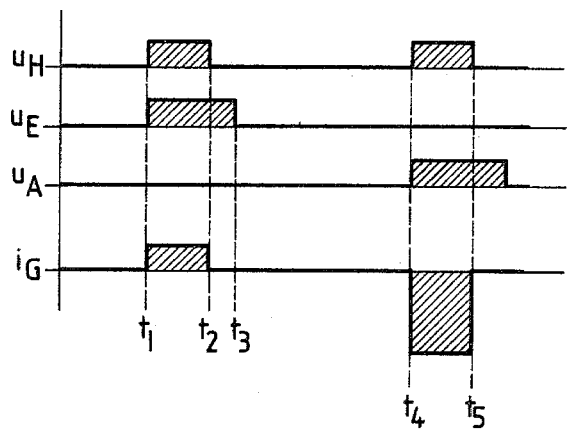
FIG. 2 is a series of pulse diagrams illustrating the time sequence of the control voltages of the transistors and of the control current for the power semiconductor of the circuit of FIG. 1.

The operation of the circuit of FIG. 1 will be explained in detail with the aid of the pulse diagram shown in FIG. 2, according to which the triggering pulse and the quenching pulse are formed in the following manner:

In order to produce a triggering pulse, the second and fourth transistors T2 and T4 are actuated at time $t_1$ by the control voltages $u_H$ and $u_E$ applied to their respective bases. This renders transistor T1 conductive so that a control current flows on the primary side of the transformer from the positive pole of the voltage source $U_G$ through the first transistor T1, the parallel connection of the first resistor R1 and capacitor C1, the first partial winding Tr1 of the transformer Tr, and the second transistor T2, back to the negative pole of the voltage source $U_G$. On the secondary side of the transformer, a control current $i_G$ flows through the secondary winding Tr3 of the transformer, the third Zener diode D3 and the gate-cathode path of the power semiconductor Th.

While the first transistor T1 is switched off at time $t_2$, upon termination of voltage $U_4$, the second transistor T2 remains actuated by continued application of the control voltage $u_E$ until time $t_3$. Thus, during the period between $t_2$ and $t_3$, a demagnetization current flows, on the primary side, through the second transistor T2, the first transformer partial winding Tr1, the first Zener diode D1 and the first diode D6. On the secondary side of the transformer Tr, the control current $i_G$ then equals zero. Between $t_2$ and $t_3$ the first transistor T1 is turned off and current flows through the second transistor T2 and the primary side of transformer Tr where it induces a voltage across secondary winding Tr3 which causes no current in the gate-circuit of the power semiconductor because of the arrangement of the third Zener-diode D3.

In order to generate a quenching pulse, the third and fourth transistors T3 and T4 are turned on by pulses of voltages $u_H$ and $u_A$ at time $t_4$. On the primary side of transformer Tr, a gate turn-off current flows from the positive pole of the voltage source through the first transistor T1, the parallel connection of the first resistor R1 and the capacitor C1, the second transformer partial winding Tr2 and the third transistor T3 to the negative pole of the voltage source.

At time $t_5$ the third transistor T3 remains conducting while the first transistor T1 is switched off due to the end of the actuating pulse $u_H$. A demagnetization current then flows through the collector-emitter path of the third transistor T3, the second transformer parallel winding Tr2, the first Zener diode D1 and the first diode D6. The gate turn-off current $i_G$ on the secondary side again equals zero.

The magnitude of the gate turn-off current $i_G$ is determined by the transformation ratio of the second partial primary winding of the transformer Tr2 to the secondary winding Tr3 of the transformer or, when the primary winding of the transformer Tr is tapped in the center, by the breakdown voltage of the third Zener diode D3.

Pulses $u_H$, $u_E$ and $u_A$ can be produced by any suitable signal generating circuit constructed on the basis of well-known engineering principles in a manner dictated by the system which is to control the semiconductor device. For example, if such system produces semiconductor turn-on pulses at a first output and turn-off pulses at a second output, the base of transistor T2 could be connected to the first output via a monostable multivibrator having an on, or quasistable, period equal to $t_3 - t_1$, the base of transistor T3 could be connected to the second output via a monostable multivibrator having an identical on period, and the base of transistor T4 could be connected to both outputs via a series arrangement of an OR-gate and a monostable multivibrator having an on period equal to $t_2 - t_1$.

It will be understood that the above description of the present invention is susceptible to various modifications, changes and adaptations, and the same are intended to be comprehended within the meaning and range of equivalents of the appended claims.

What is claimed is:

1. In a method for controlling a power semiconductor which can be triggered into conduction by pulses of one polarity and quenched again by pulses of the opposite polarity, by transmitting such pulses via a transformer to the power semiconductor connected at the secondary side of the transformer, the improvement comprising forming such a pulse by turning on a first transistor connected between one pole of a voltage source and a tap which divides the primary winding of the transformer into two partial windings, and by selectively turning on either one of second and third transistors each connected to the end of a respective partial winding, and terminating such a pulse by switching off the first transistor, while maintaining on the selected second or third transistor in order to cause the demagnetization current of the transformer to flow through the selected transistor and a first Zener diode connected between the tap of the primary winding and the other pole of the voltage source, the anode side of the first Zener diode being connected to the tap of the primary winding.

2. In a circuit for controlling a power semiconductor which can be triggered into conduction by pulses of one polarity and then quenched by pulses of the opposite polarity, which circuit includes a transformer having its secondary connected to the semiconductor, the improvement wherein said transformer includes a primary winding provided with a tap dividing said primary into two primary partial windings, and said circuit further comprises: a direct voltage source; a first transistor having its collector-emitter path connected across the output poles of said voltage source; a first resistor connected between said first transistor and said tap; a first Zener diode having its anode connected to said tap; a first diode having its cathode connected to the cathode of said first Zener diode and its anode connected to one pole of said voltage source; a second transistor having its collector-emitter path connected between one end of said primary winding and the one pole of said voltage source; a third transistor having its collector-emitter path connected between the other end of said primary winding and the one pole of said voltage source, such that each said partial winding and a respective one of said second and third transistors is connected in parallel with the series arrangement of said first Zener diode and said first diode; and means for rendering said first transistor and a selected one of said second and third transistors conductive in order to initiate one such pulse, subsequently switching off said first transistor while maintaining the selected one of said second and third transistors conductive in order to terminate the pulse while providing a path for a transformer demagnetization current through said first Zener diode and said first diode.

3. An arrangement as defined in claim 2 wherein said means comprise second and third resistors, a second Zener diode having its cathode connected to said third resistor, a second resistor, and a fourth transistor, with the collector-emitter path of said fourth transistor forming a series circuit path with said second and third resistors and said second Zener diode, which path is connected across said voltage source, and the base of said first transistor is connected to the point of connection between said third resistor and said second Zener diode.

4. An arrangement as defined in claim 2 wherein said primary partial windings of said transformer both have the same number of coil turns and further comprising a third Zener diode connected at the secondary of said transformer and connected via its anode to the gate of the power semiconductor.

5. An arrangement as defined in claim 2 wherein said two primary partial windings of said transformer have respectively different numbers of coil turns.

* * * * *